(12) United States Patent
Tsai

(10) Patent No.: US 7,086,415 B2
(45) Date of Patent: Aug. 8, 2006

(54) CONTROL VALVE

(75) Inventor: Lung-Po Tsai, Taipei Hsien (TW)

(73) Assignee: Ho Lee Co., Ltd., Taipei Hsien (TW)

( * ) Notice: Subject to any disclaimer, the term of this patent is extended or adjusted under 35 U.S.C. 154(b) by 211 days.

(21) Appl. No.: 10/776,182

(22) Filed: Feb. 12, 2004

(65) Prior Publication Data
US 2005/0178435 A1 Aug. 18, 2005

(51) Int. Cl.
F16K 15/20 (2006.01)
(52) U.S. Cl. ............................ 137/625.11; 137/625.48; 137/223
(58) Field of Classification Search ........... 137/625.11, 137/625.12, 861, 862, 878, 625.48, 625.5, 137/625, 223
See application file for complete search history.

(56) References Cited

U.S. PATENT DOCUMENTS 3,524,470 A * 8/1970 Kah, Jr. et al. ......... 137/624.18
3,785,391 A * 1/1974 Miller .................... 137/119.03
3,924,652 A * 12/1975 Kah, Jr. ................. 137/119.03

* cited by examiner

Primary Examiner—Eric Keasel
Assistant Examiner—Craig Schneider
(74) Attorney, Agent, or Firm—Bacon & Thomas

(57) ABSTRACT

A control valve includes a horn-like body and a seat with an interior surface mounted on the rear. A secondary outlet, primary outlet and inlet are defined through the seat. Two hollow poles are formed at the interior surface of the seat and two first resilient members are mounted respectively in the hollow poles. A cover is mounted in the body and has two rods mounted in the hollow poles and abutting the first resilient members. Two shafts are formed in the cover and aligned respectively with the secondary outlet and primary outlet. Two valve disks are formed respectively at distal ends of the shafts and respectively align with the outlets. Two buttons are mounted on an outer surface of the cover, and each has a barb to selectively engage a recess defined in the horn-like body.

5 Claims, 11 Drawing Sheets

CONTROL VALVE

BACKGROUND OF THE INVENTION

1. Field of the Invention

The present invention relates to a valve for an inflatable apparatus, and more particularly to a control valve for an inflatable airbed, armchair or the like.

2. Description of Related Art

A conventional inflatable airbed generally has an inflatable pillow that communicates with the inflatable airbed. The inflatable airbed and the inflatable pillow must be inflated at the same time by a pump. Selectively inflating either the inflatable airbed or the pillow based on a user's needs is impossible.

Therefore, the invention provides a control valve to mitigate or obviate the aforementioned problems.

SUMMARY OF THE INVENTION

The main objective of the present invention is to provide a control valve which can be operated selectively to inflate two separate spaces in an inflatable apparatus.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
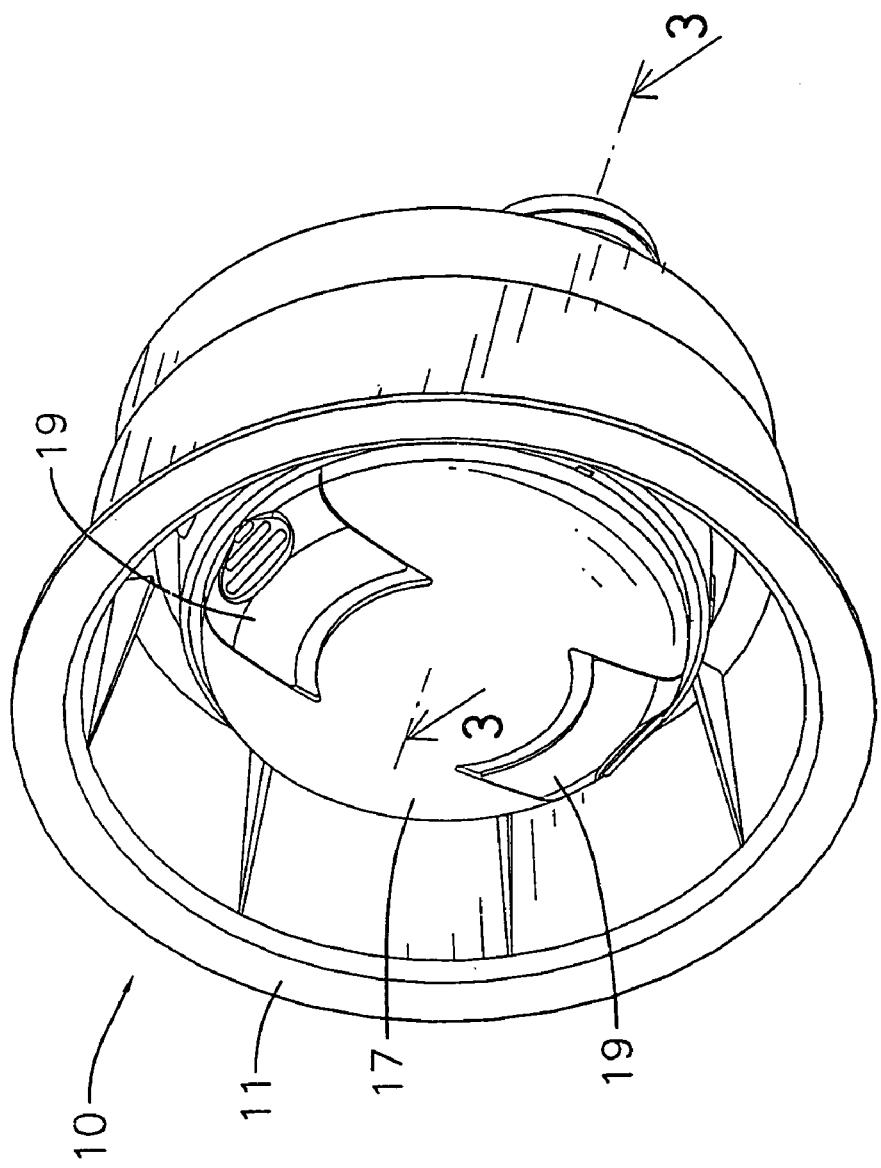
FIG. 1 is a perspective view of a control valve for an inflatable airbed in accordance with the invention.
Figure 2:
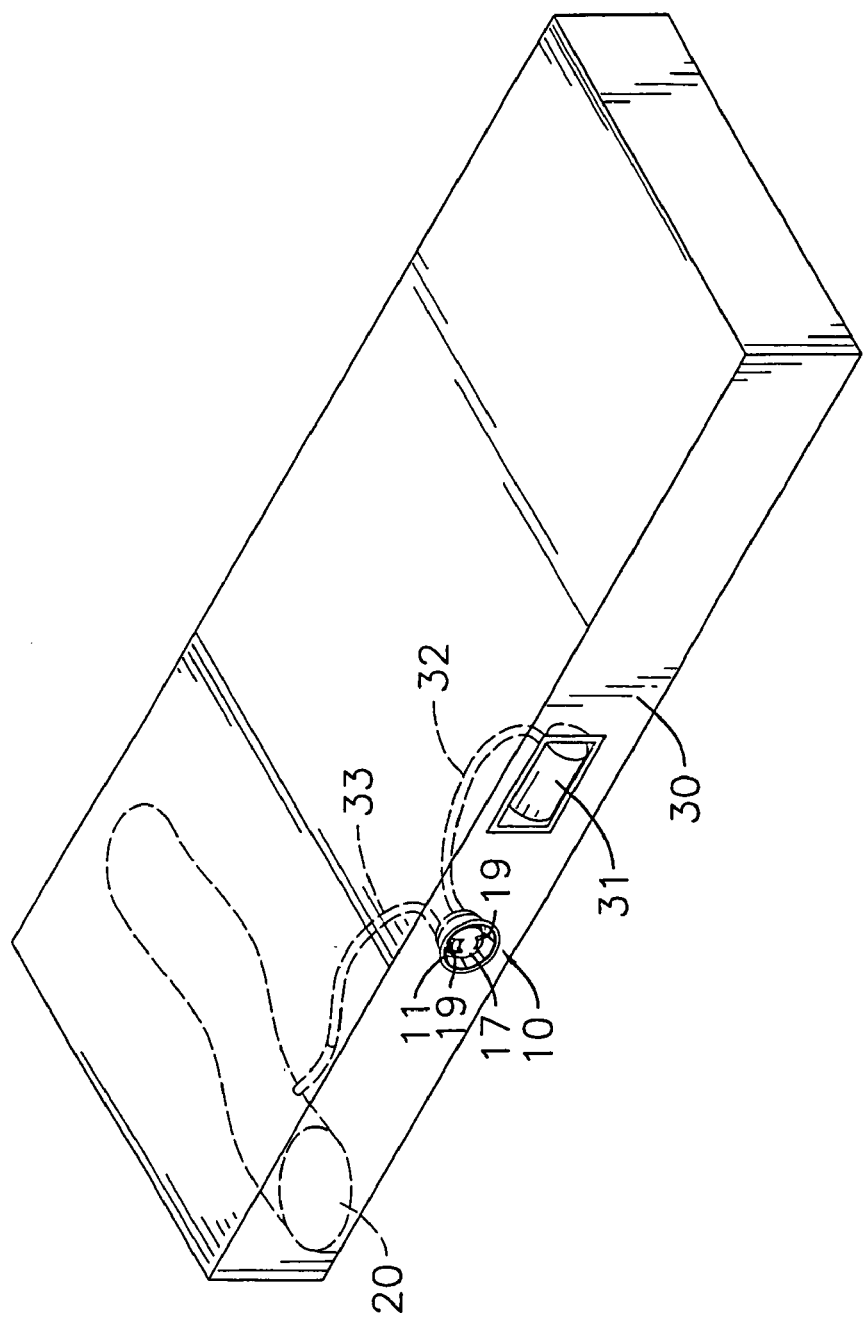
FIG. 2 is an operational perspective view of an inflatable airbed with the control valve in FIG. 1.
Figure 3:
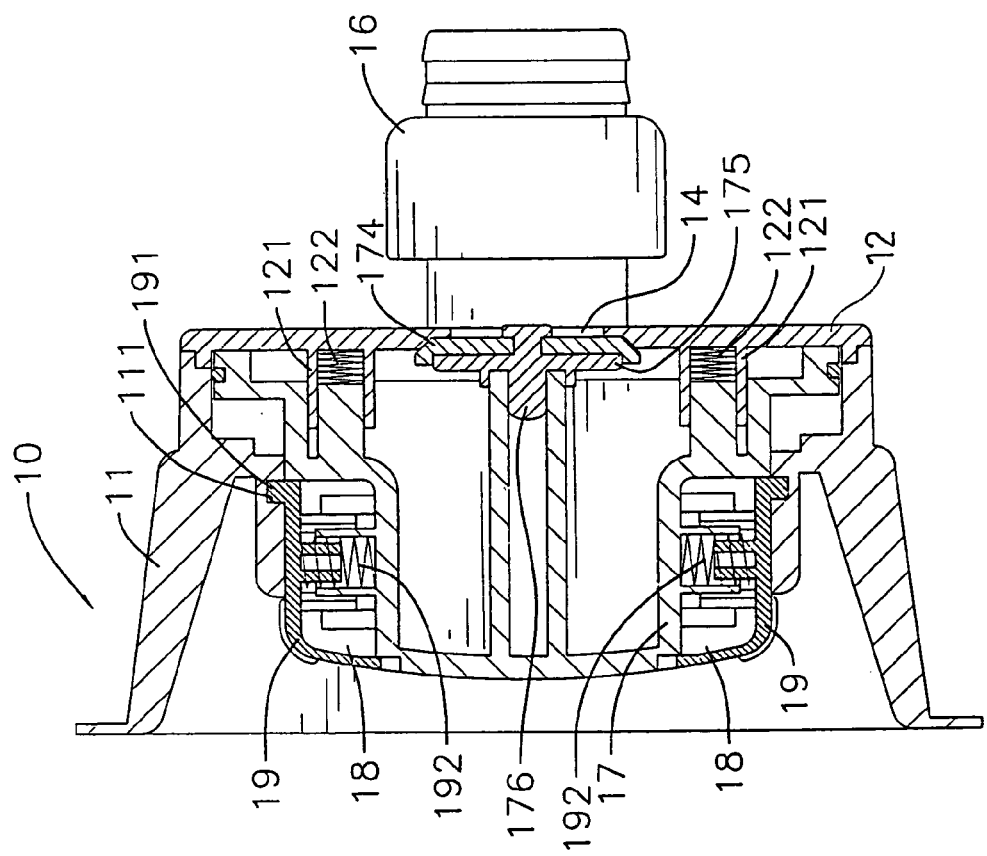
FIG. 3 is a cross sectional side plan view of the control valve along line 3—3 in FIG. 1 configured to inflate an inflatable pillow.

With reference to FIGS. 1 to 3, a control valve (10) in accordance with the present invention is installed in an inflatable airbed (30) with an inflatable pillow (20). The inflatable airbed (30) and inflatable pillow (20) have separate interiors (not numbered). The control valve (10) is connected to a pump (31) by a supply duct (32), and with the inflatable pillow (20) by a discharge duct (33).

The control valve (10) has a horn-like body (11), a seat (12) and a cover (17).

The horn-like body (11) has a front (not numbered), a rear (not numbered), a center (not numbered), a central portion (not numbered), a chamber (not numbered), a tubular part (not numbered) and two recesses (111). The chamber is defined in the rear of the body (11) and has an inner wall (not numbered). The tubular part (not numbered) is defined in the central portion of the horn-like body (11) concentrically around the center, has an inner wall (not numbered) and communicates with the chamber. Two recesses (111) are defined respectively at diametrically opposite sides of the inner wall of the tubular part of the horn-like body (11).

Figure 5:
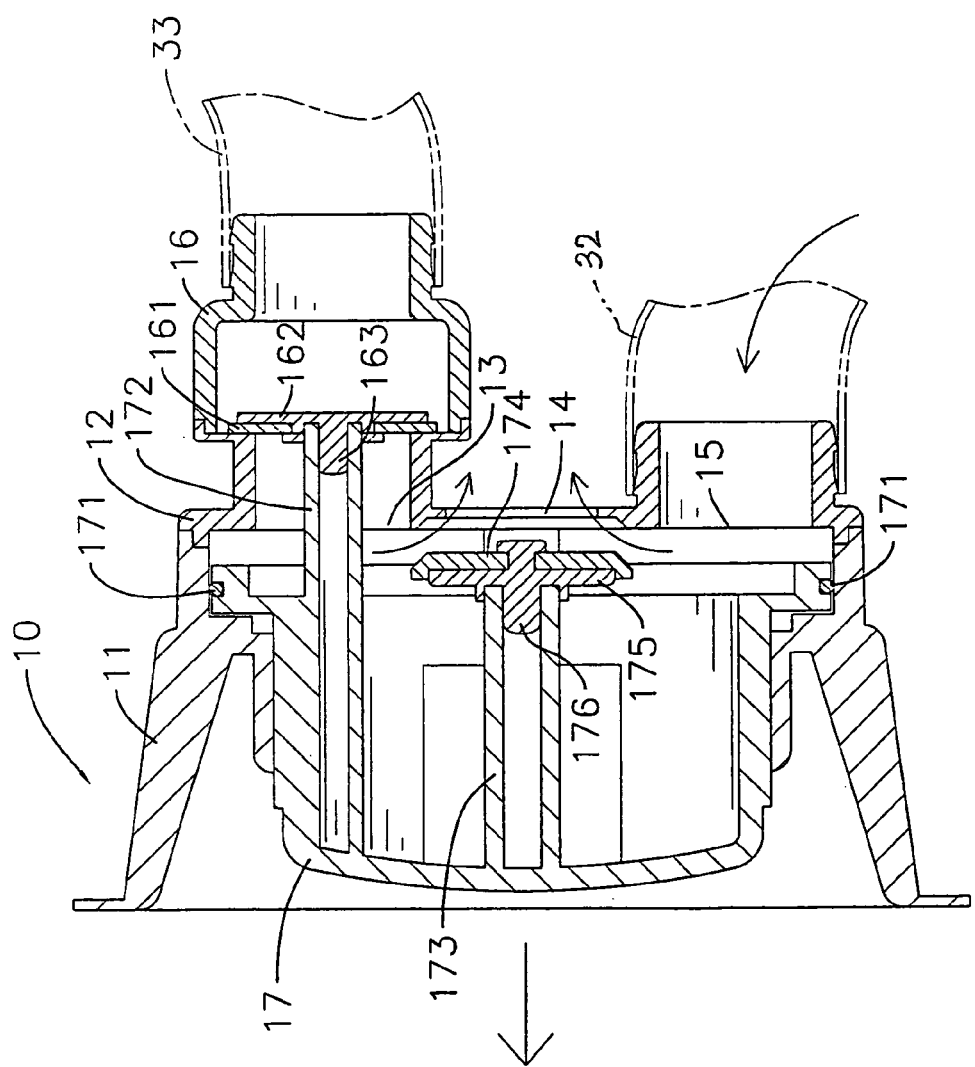
FIG. 5 is a cross sectional top plan view of the control valve along line 5—5 in FIG. 4.

With further reference to FIG. 5, the seat (12) is mounted on the rear of the body (11), may be circular and has a central portion (not numbered), an outer edge (not numbered), an rear surface (not numbered), a front surface (not numbered), a secondary outlet (13), a primary outlet (14), an inlet (15), a discharge nozzle (16) and two hollow poles (121). The primary outlet (14) is formed through the central portion of the seat (12) and communicates with the chamber. The secondary outlet (13) and inlet (15) are formed through the seat (12) respectively on diametrically opposite sides of the primary outlet (14) and communicate with the chamber. The secondary outlet (13) has a diameter (not numbered) and a secondary valve seat (161). The secondary valve seat (161) has an outer diameter (not numbered), a central through hole (not numbered), an outside surface (not numbered) and an inside surface (not numbered). The outer diameter is larger than the diameter of the secondary outlet (13), and the secondary valve seat (161) is attached concentrically outside the secondary outlet (13). The inlet (15) is connected to the pump (31) by the supply duct (32). The discharge nozzle (16) is mounted on the rear surface of the seat (12) around the secondary outlet (13) and is connected to the pillow (20) by the discharge duct (33). The primary outlet (14) has a diameter (not numbered) and communicates with the interior of the inflatable airbed (30).

The two hollow poles (121) are formed on the front surface of the seat (12) and have first resilient members (122) mounted respectively in the hollow poles (121).

The cover (17) is movably mounted inside the body (11) and has a rear (not numbered), an inside (not numbered), a center (not numbered), an outer surface (not numbered), a radial flange (not numbered), two rods (not numbered), an O-ring (171), a secondary hollow shaft (172), a primary hollow shaft (173), two notches (18) and two buttons (19).

The radial flange is formed at and extends radially out from the rear, has an outer edge (not numbered) and is mounted in the chamber in the horn-like body (11). The two rods are formed on the rear of the cover (17), are mounted respectively in the hollow poles (121) and abut the first resilient members (122).

The O-ring (171) is mounted between the outer edge of the radial flange of the cover (17) and the inner wall of the chamber in the horn-like body (11).

The secondary hollow shaft (172) is formed longitudinally on the inside of the cover (17), has a distal end (not numbered) and a secondary valve disk (162), is aligned with the secondary outlet (13) and extends into the discharge nozzle (16).

The secondary valve disk (162) is mounted on the distal end of the secondary hollow shaft (172) and in the discharge nozzle (16) and has a center (not numbered), an inside surface (not numbered), an outside surface (not numbered) and a disk shaft (163). The disk shaft (163) is formed on the inside surface at the center of the secondary valve disk (162) and is mounted in the distal end of the secondary hollow shaft (172).

The secondary valve disk (162) selectively abuts the outside surface of the secondary valve seat (161) to open or close the secondary outlet (13) by moving the secondary hollow shaft (172) longitudinally.

The primary hollow shaft (173) is formed longitudinally on the inside of the cover (17) at the center, has a distal end (not numbered), a primary valve disk (175) and a primary valve seat (174) and is aligned with the primary outlet (14). The primary valve disk (175) and the primary valve seat (174) selectively close and open the primary outlet (14).

The primary valve disk (175) is mounted on the distal end of the primary hollow shaft (173) and has a center (not numbered), an inside surface (not numbered), an outside surface (not numbered) and a disk shaft (176). The disk shaft (176) is formed on the inside surface at the center of the primary valve disk (175) and is mounted in the distal end of the primary hollow shaft (173).

A primary valve seat (174) has an outer diameter (not numbered), a central through hole (not numbered), an outside surface (not numbered) and an inside surface (not numbered). The outer diameter is larger than the diameter of the primary outlet (14). The primary valve seat (174) is attached concentrically to the outside surface of the primary valve disk (175) and selectively closes and opens the primary outlet (14) by moving the primary hollow shaft (173) longitudinally.

Two notches (18) are defined on diametrically opposite sides of the outer surface of the cover (17). Two buttons (19) are movably mounted respectively in the notches (18) and respectively have a proximal end (not numbered) and a barb (191). The barbs (191) are formed respectively at the proximal ends and respectively engage the recesses (111) in the horn-like body (11).

The two second resilient members (192) are radially mounted respectively in the notches (18) and abut and press the buttons (19) out radially.

Figure 4:
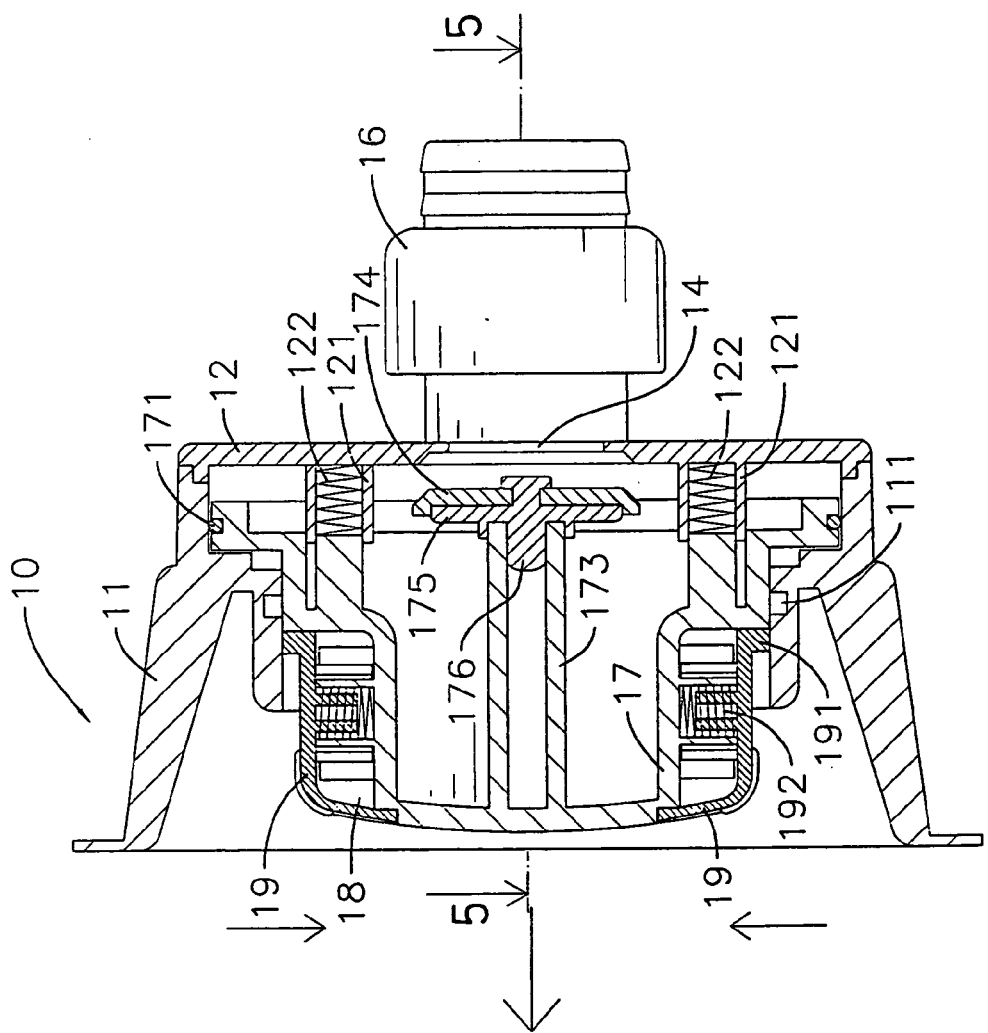
FIG. 4 is a cross sectional side plan view of the control valve in FIG. 1 configured to inflate an inflatable airbed.

With reference to FIGS. 2, 4 and 5, the cover (19) may be held in an outermost position or an innermost position to selectively open and close the outlets (13, 14). When the barbs (191) are disengaged from the recesses (111), the cover (19) is at the outermost position, which causes the secondary outlet (13) to be closed by the secondary valve seat (161) and the primary outlet (14) to be open. When the pump (31) is actuated, air is pumped through the inlet (15) and the primary outlet (14) into the inflatable airbed (30). Thus, the inflatable airbed (30) is inflated. When a deflating switch (not shown) on the pump (31) is turned on, the inflatable airbed (30) is individually deflated.

Figure 6:
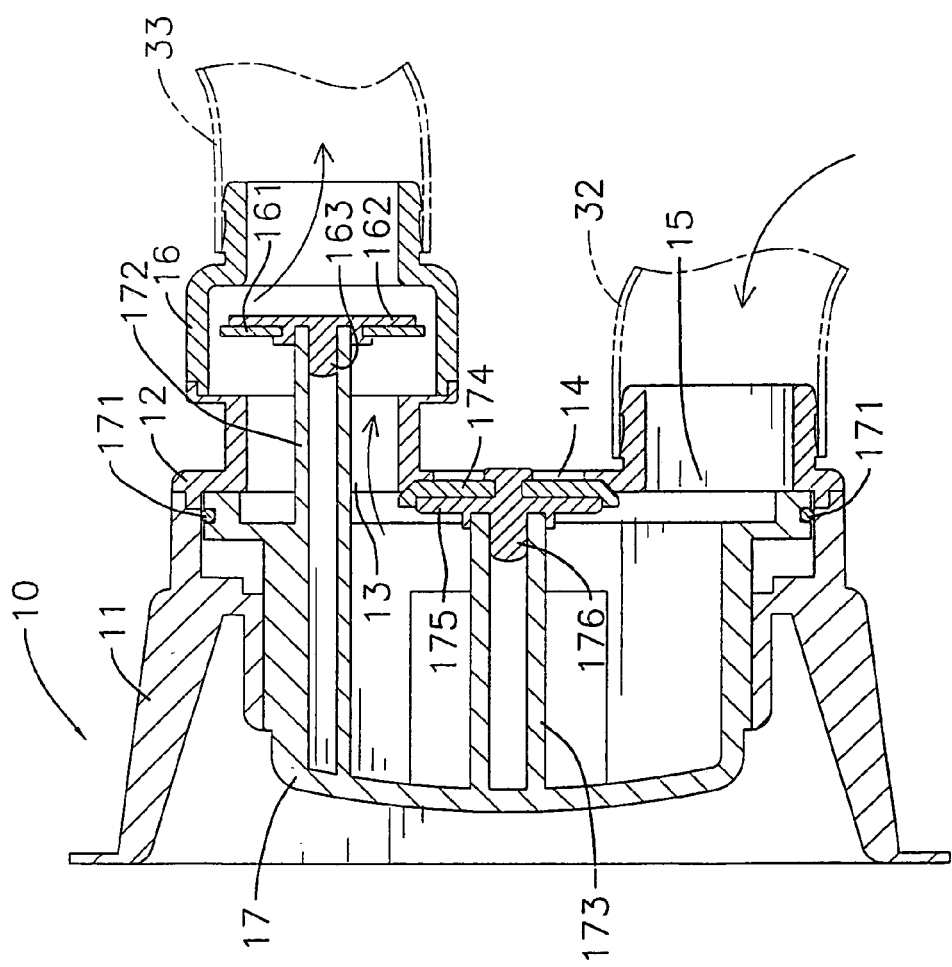
FIG. 6 is a cross sectional top plan view of the control valve in FIG. 3.
Figure 7:
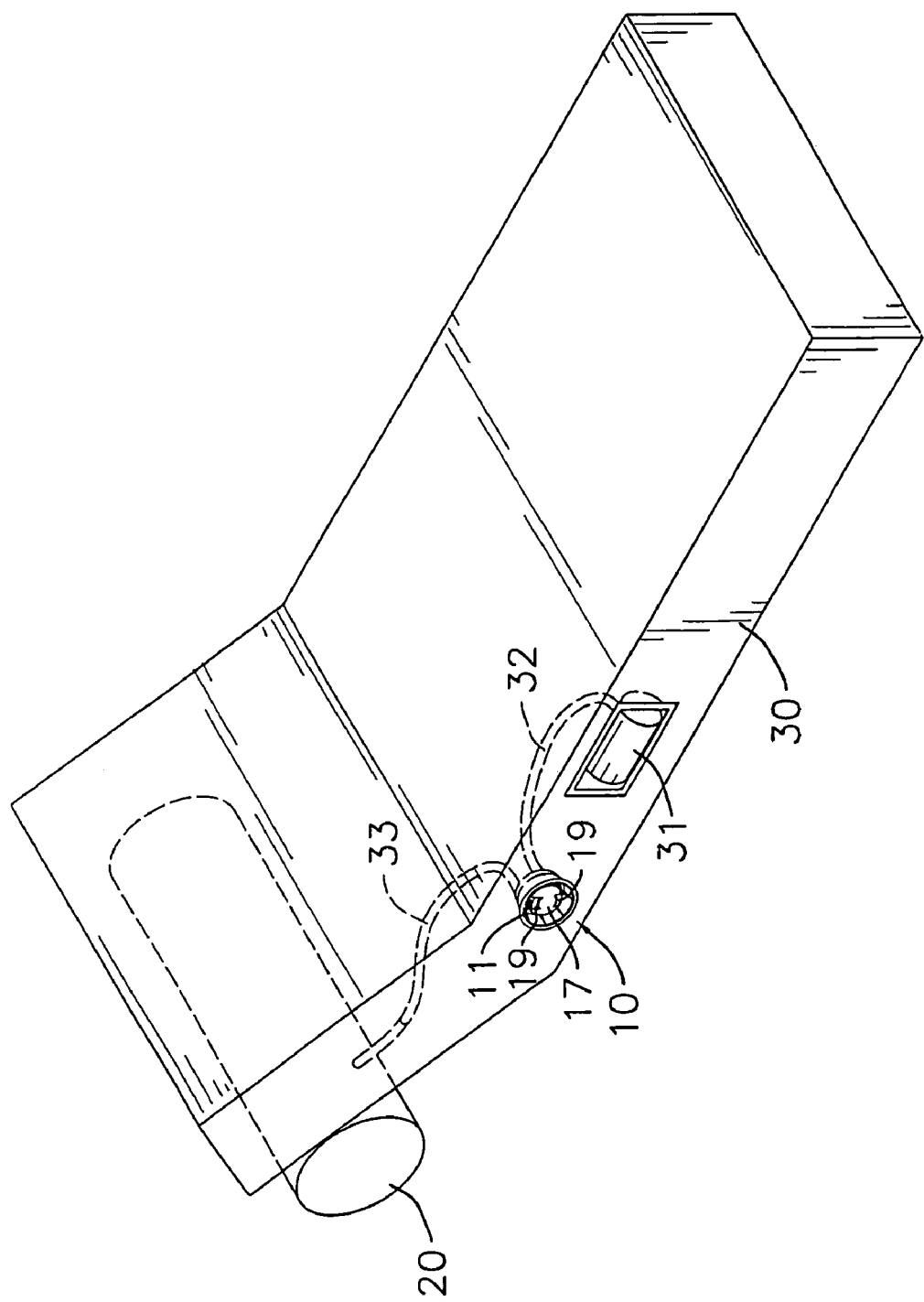
FIG. 7 is an operational perspective view of the inflated inflatable airbed and pillow and the control valve in FIG. 1.

With reference to FIGS. 3, 6 and 7, the cover (19) is pressed inwards to the innermost position and the barbs (191) engage the recesses (111) and hold the cover (19) in position. With the cover (19) in the innermost position, the secondary outlet (13) is open, and the primary outlet (14) is closed by the primary valve seat (174). Therefore, when the pump (31) is actuated, air is pumped through the inlet (15), the secondary outlet (13) and the nozzle (16) into the pillow (20). Thus, the pillow (20) is inflated to raise the inflatable airbed (30) at the pillow end. When the deflating switch on the pump (31) is turned on, the pillow (20) is individually deflated.

To individually inflate the inflatable airbed (30) again, the buttons (19) can be pressed inwards and disengaged from the recesses (111) so the cover (17) can be pulled outwards to the outermost position.

Figure 8:
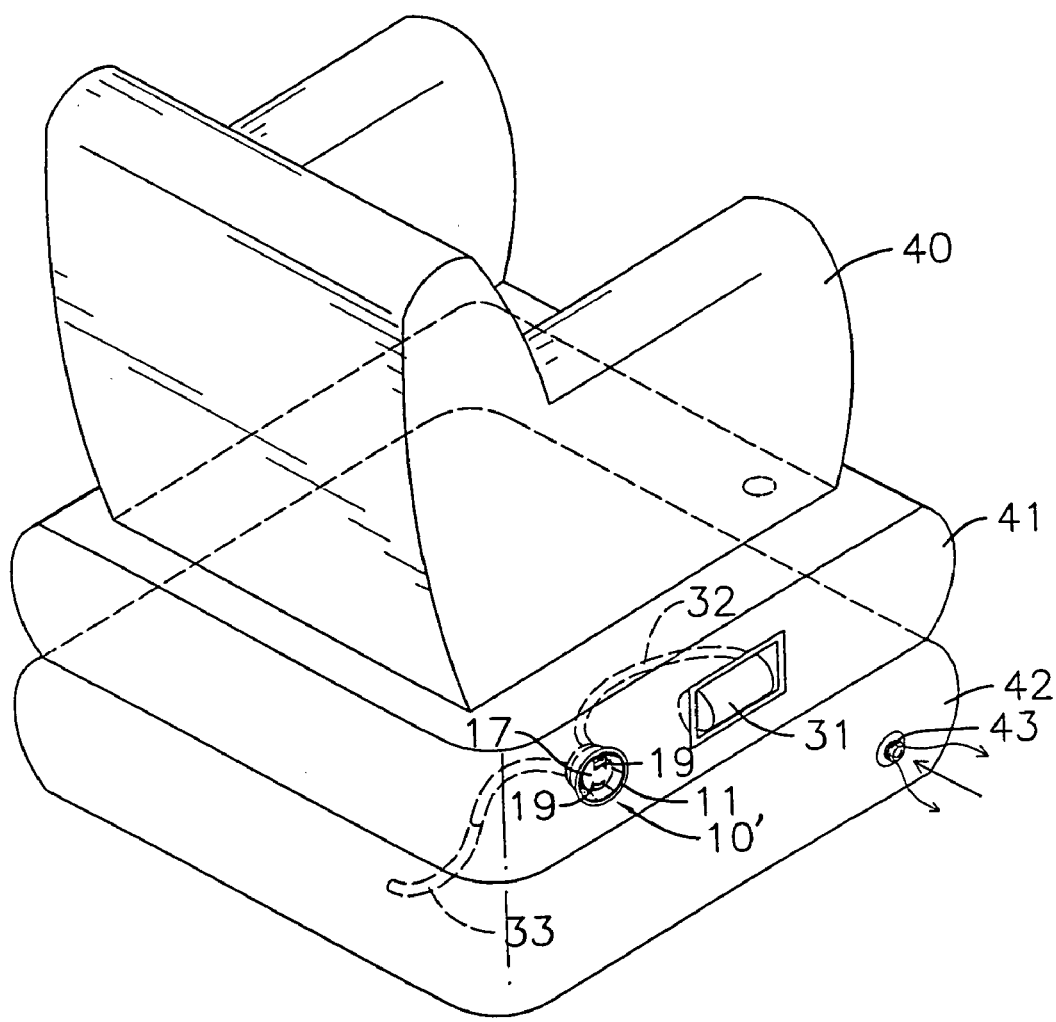
FIG. 8 is an operational perspective view of another embodiment of the control valve in FIG. 1 in an inflatable armchair.
Figure 9:
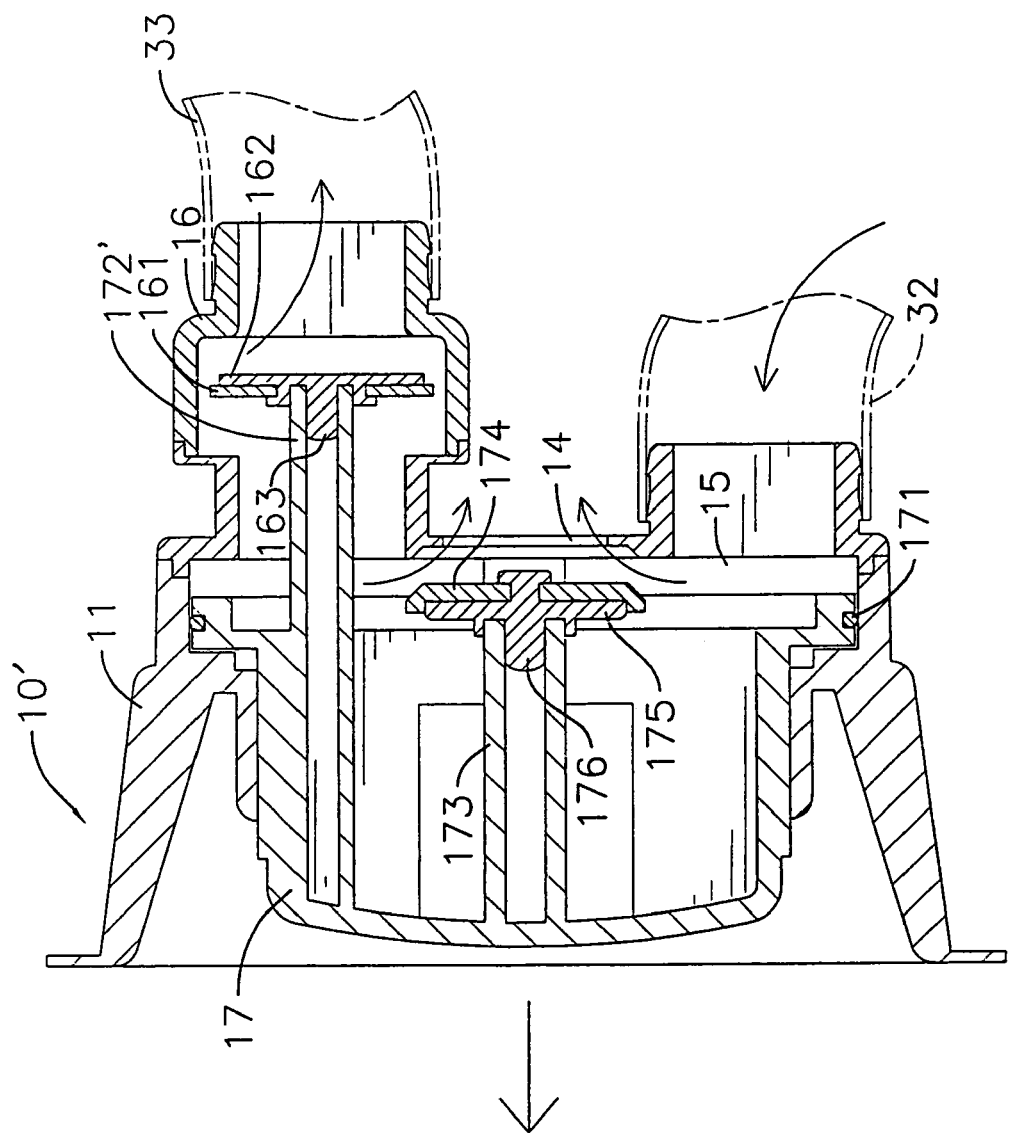
FIG. 9 is a cross sectional top plan view of the control valve in FIG. 8 in an open status.

With reference to FIGS. 8 and 9, another application of the present invention uses the control valve (10') with an air armchair (40) having an upper air cushion (41) and a base air cushion (42). The upper air cushion (41) is mounted under the air armchair (40) and communicates with the air armchair (40), and the base air cushion (42) is mounted under the upper air cushion (41) and is separate from the upper air cushion (41).

The primary outlet (14) communicates with the upper air cushion (41), and the discharge nozzle (16) is communicates with the base air cushion (42) through the discharge duct (33). The secondary hollow shaft (172') is longer than the secondary hollow shaft (172) in the first embodiment to open and close the discharge nozzle (16) and the primary outlet (14) simultaneously.

Figure 10:
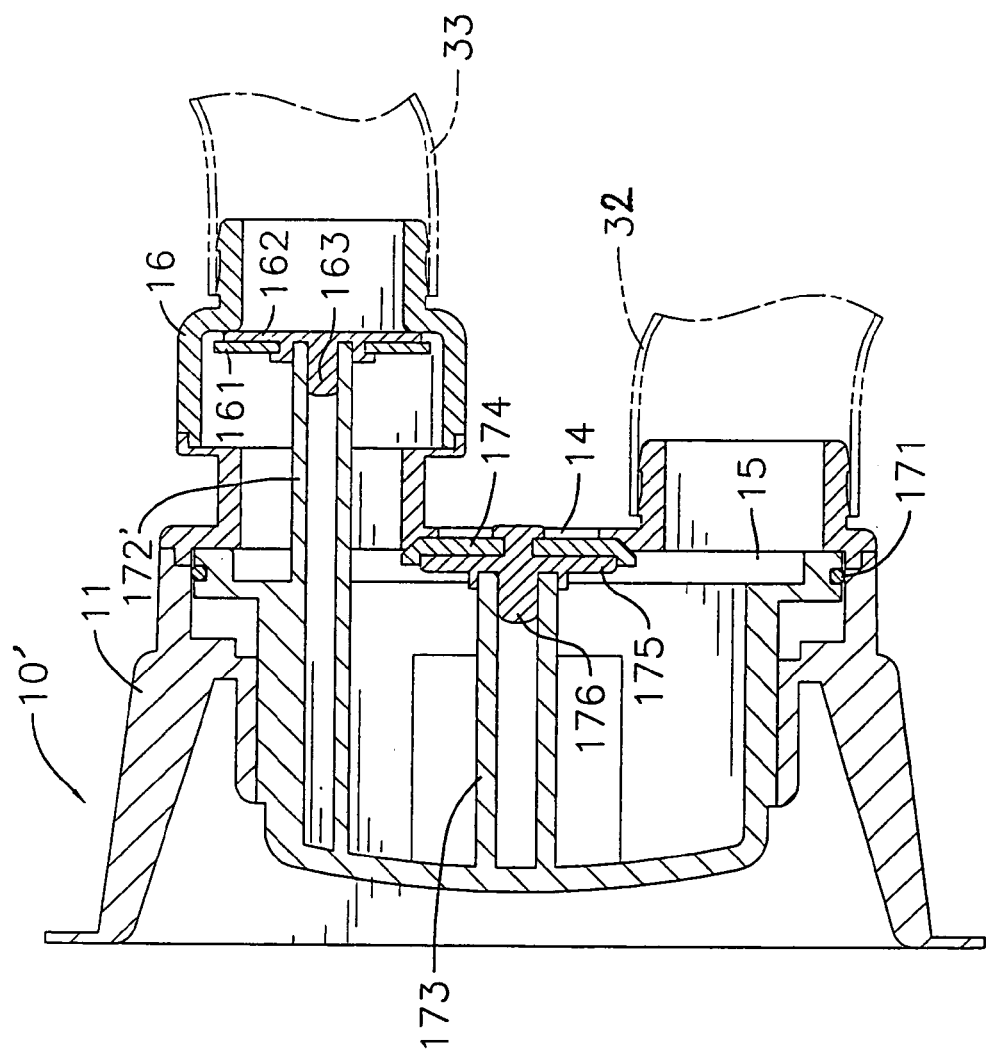
FIG. 10 is a cross sectional top plan view of the control valve in FIG. 8 in a closed status.

With further reference to FIG. 10, pressing the cover (17) inwards until the radial flange is at the innermost position causes the secondary valve disk (162) at the distal end of the secondary hollow shaft (172') to close the discharge nozzle (16) and the primary valve seat (174) to close the primary outlet (14).

When the cover (17) is pulled outwards and the radial flange is at the outermost position, the discharge nozzle (16) and the primary outlet (14) are open. Therefore, when the pump (31) is actuated, the armchair (40), the upper air cushion (41), and the base air cushion (42) are inflated at the same time.

Figure 11:
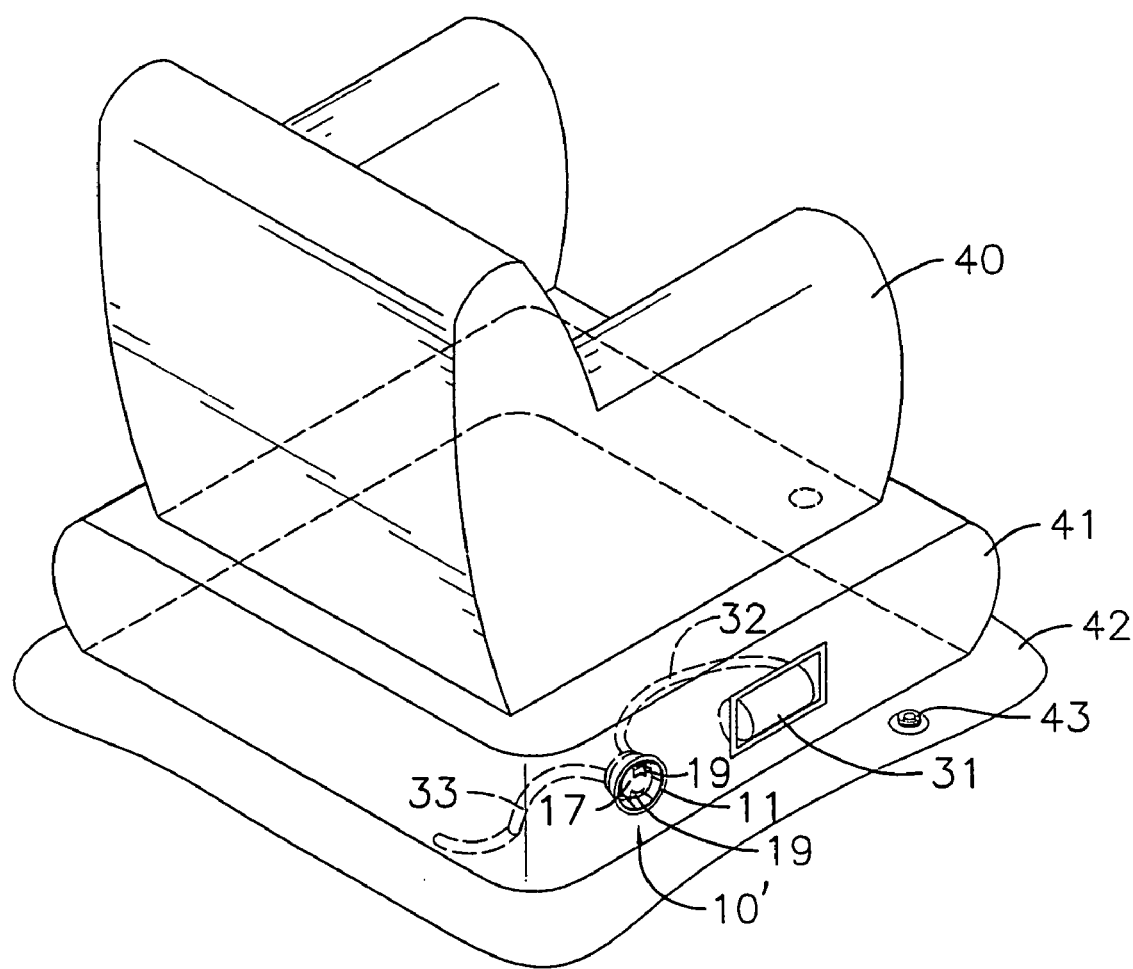
FIG. 11 is an operational perspective view of the inflatable armchair with the control valve in FIG. 1 and a deflated air pad.

With further reference to FIG. 11, the base air cushion (42) further has a vent (43) defined through the base air cushion (42). When the cover (17) is pressed to close the discharge nozzle (16) and the primary outlet (14), the base air cushion (42) can be deflated individually by opening the vent (43) to lower the height of the armchair (40).

For raising the armchair (40) again, the cover (17) is pulled outwards to allow the discharge nozzle (16) and the primary outlet (14) to communicate with the armchair (40), the upper air cushion (41) and the base air cushion (42). Then, the pump (31) is turned on to inflate the base air cushion (42), and the armchair (40) is raised.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A control valve for an inflatable apparatus comprising a horn-like body having
    a front;
    a rear;
    a center;
    a central portion;
    a chamber defined in the rear and having an inner wall;
    a tubular part defined in the central portion of the horn-like body concentrically around the center, having an inner wall and communicating with the chamber; and
    two recesses defined respectively at diametrically opposite sides of the inner wall of the tubular part;
a seat mounted on the rear of the body and having
    a central portion;
    an outer edge;
    a rear surface;
    a front surface;

a primary outlet formed through the central portion of the seat, communicating with the chamber and having a diameter;

a secondary outlet formed through the seat between the primary outlet and the edge, communicating with the chamber and having a diameter and a secondary valve seat having an outer diameter larger than the diameter of the secondary outlet and attached concentrically outside the secondary outlet, a central through hole, an outside surface and an inside surface;

an inlet formed through the seat between the primary outlet and the edge and diametrically opposite to the secondary outlet and communicating with the chamber;

a discharge nozzle mounted on the rear surface of the seat around the secondary outlet;

at least two hollow poles formed on the front surface of the seat;

at least two first resilient members mounted respectively in the hollow poles; and a cover movably mounted inside the body and having
a rear;
an inside;
a center;
an outside surface;
a radial flange formed at and extending radially out from the rear of the cover, having an outer edge and mounted in the chamber in the horn-like body;
an O-ring mounted between the outer edge of the radial flange of the cover and the inner wall of the chamber in the horn-like body;
two rods formed on the rear of the cover, mounted respectively in the hollow poles and abutting the first resilient members;
a secondary shaft formed longitudinally on the inside of the cover, aligned with the secondary outlet, movably extending into the discharge nozzle and having a distal end and a secondary valve disk mounted on the distal end of the secondary shaft in the discharge nozzle to open and close the secondary outlet,
a primary shaft formed longitudinally on the inside of the cover at the center, aligned with the primary outlet and having
a distal end; and
a primary valve disk mounted on the distal end of the primary hollow shaft and a primary valve seat to selectively close and open the primary outlet;

two notches defined on diametrically opposite sides of the outer surface of the cover;

two buttons movably mounted respectively in the notches and respectively having a distal end and a barb formed on the distal end and engaging the corresponding recess, and two second resilient members radially mounted respectively in the notches and abutting and pressing the buttons out radially.

2. The control valve as claimed in claim 1, wherein
the secondary valve disk is mounted in the discharge nozzle and has
a center;
an inside surface;
an outside surface; and
a disk shaft formed on the inside surface at the center of the secondary valve disk and mounted in the distal end of the secondary shaft; and
the secondary valve seat is mounted concentrically outside the secondary outlet so the secondary valve disk selectively abuts the secondary valve seat to close or open the secondary outlet.

3. The control valve as claimed in claim 2, wherein the secondary valve seat has an outer diameter greater than a diameter of the secondary outlet.

4. The control valve as claimed in claim 1, wherein
the primary valve disk has
a center;
an inside surface;
an outside surface;
a disk shaft formed on inside surface at the center of the primary valve disk and mounted in the distal end of the hollow primary shaft, and
the primary valve seat has
an outer diameter;
a central through hole;
an outside surface; and
an inside surface; and
the primary valve seat is mounted on the outside surface of the primary valve disk to selectively abut and close and open the primary outlet.

5. The control valve as claimed in claim 4, wherein the outer diameter of the primary valve seat is larger than the diameter of the primary outlet.

* * * * *